3,331,815
POLYHALOGENOUS POLYESTER PREPARATION
Michael Kokorudz, Wyandotte, William K. Langdon, Grosse Ile, Pauls Davis, Gibraltar, and Herwart C. Vogt, Grosse Ile, Mich., assignors to Wyandotte Chemicals Corporation, Wyandotte, Mich., a corporation of Michigan
No Drawing. Filed Aug. 28, 1964, Ser. No. 392,941
13 Claims. (Cl. 260—78.4)

The present invention relates to the production of polyesters, and is more particularly concerned with polyhalogenous polyesters having pendant polyhalogenoalkyl groups which are extremely useful as non-self-fusing polyester materials of increased chemical and fire resistance and which are particularly useful in the preparation of more complex compositions which have a relatively high order of non-flammability and which in many cases are non-burning as well as self-extinguishing.

This application is a continuation-in-part of co-pending patent application Ser. No. 379,701, filed July 1, 1964, now abandoned, to Pauls Davis and Herwart C. Vogt.

Co-pending U.S. patent application Ser. No. 236,683, now U.S. Patent 3,254,057, to Pauls Davis is directed to a novel class of polyhalogenous polyesters having a relatively high halogen content and characterized by pendant lower-alkyl groups having up to two carbon atoms and containing at least two halogen atoms, said pendant polyhalogenous lower-alkyl groups being built into the polyester chain as exo-substituents of an oxyalkylene moiety thereof. When they contain ethylenic unsaturation, these polyesters can be cross-linked with unsaturated monomers to give hard plastics which have physical properties comparable or superior to those of commercially available polyester plastics, superior chemical stability as compared with many commercial polyester plastics, and which are often non-burning.

These polyesters are polyesters of an organic dicarboxy compound and a polyhalogenous alkylene oxide. They may be prepared by reacting an organic dibasic acid or acid anhydride or mixtures thereof with one or more polyhalogenous alkylene oxides or mixtures of a polyhalogenous alkylene oxide with a non-polyhalogenous alkylene oxide, which is preferably saturated or free from other than aromatic unsaturation. Essentially, the polyhalogenous alkylene oxide, and non-polyhalogenous alkylene oxide if used, reacts with the dibasic acid or anhydride to give a polymer chain comprising alternating acid and oxyalkylene units, one or two or more of such oxyalkylene units being joined in the polymer chain, depending on the reactants and ratio of reactants, said polymer chain being characterized by pendant polyhalogenoalkyl groups.

In accordance with the teachings of the co-pending patent application Ser. No. 236,683, the reaction can be carried out by merely heating and reacting the polyhalogenous alkylene oxide with the starting organic carboxy compound, but it is preferably conducted in the presence of a reaction catalyst, Friedel-Crafts type catalysts being generally preferred. Numerous catalysts of this type are listed in the application.

While the catalysts set forth in the above co-pending application are satisfactory, they possess certain disadvantages due to high moisture sensitivity, a high degree of toxicity, a tendency to initiate homopolymerization of polyhaloalkylene oxides and a tendency to cause gelation. The preferred catalyst, aluminum chloride, forms a complex with maleic anhydride which is a slush and is corrosive, thus presenting difficult handling problems. In addition, it must be added to the reaction mixture at room temperature. Furthermore, after addition of the catalyst to the reaction mixture at room temperature, the reaction mixture must be heated to rather high temperatures before the reaction commences. The reaction is then very exothermic and difficult to control. In fact, lack of reaction control is one of the primary disadvantages associated with the typical Friedel-Crafts catalysts.

Accordingly, it is a purpose of this invention to provide a new process for the production of polyhalogenous polyesters wherein a new catalyst system is employed. This new catalyst system is not as sensitive to moisture and is not as corrosive or as toxic as the prior art catalysts. Furthermore, it does not cause gelation, does not homopolymerize any of the components utilized in the production of the polyhalogenous polyesters, may be added at temperatures substantially above room temperature, and permits pin-point control of the reaction.

The catalyst system of this invention comprises the reaction product of aluminum isopropoxide with a carboxylic acid. Accordingly, the process of this invention is a process for preparing a polyester which is characterized by the presence of pendant haloalkyl groups which have up to two carbon atoms and which contain at least two halogen atoms, comprising heating and contacting in the presence of a catalyst system comprising the reaction product of aluminum isopropoxide with a carboxylic acid (1) a member selected from the group consisting of
    (a) dicarboxylic acid anhydrides,
    (b) dicarboxylic acids, and
    (c) mixtures of (a) with (b), and
(2) a vicinal alkylene oxide, selected from the group consisting of
    (a) a vicinal alkylene oxide containing from three to four carbon atoms, inclusive, and having an alkyl group attached to a carbon atom of the oxirane ring, said alkyl group having up to two carbon atoms and containing at least two halogen atoms, each halogen having an atomic weight of nineteen to eighty, inclusive, and
    (b) an alkylene oxide as defined in (a) together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and alkyl group, said alkyl group having up to two carbon atoms and containing from zero to one halogen atom, inclusive, any halogen having an atomic weight of nineteen to eighty, inclusive, said alkylene oxide as defined in (a) being present in amount of at least about fifty percent by weight of the total amount of alkylene oxide as defined in (b).

There are two essential components of the catalyst system of this invention. One is aluminum isopropoxide and the other is a monocarboxylic or dicarboxylic acid. The exact chemical structure of the catalyst is unknown. Since trivalent aluminum is present, the catalyst system may contain isopropoxide radicals, carboxylate radicals, and radicals which are mixtures thereof. It is possible that such an excess of acid to aluminum isopropoxide may be used that a completely tricarboxylated aluminum compound may be prepared. In any event, the catalyst system is defined to include all possible reaction products of an aluminum isopropoxide with a carboxylic acid.

One component utilized in preparing the catalyst system of this invention is carboxylic acid. Representative compounds include aliphatic monocarboxylic and dicarboxylic acids such as formic, acetic, propionic, butyric, valeric, caproic, capric, stearic, malonic, succinic, perfluorosuccinic, glutaric, perfluoroglutaric, adipic, perfluoroadipic, pimelic, suberic, azelaic and sebacic; cycloaliphatic monocarboxylic and dicarboxylic acids such as hexahydrobenzoic, quinic, hexahydrosalicylic, tetrahydrophthalic, hexahydroterephthalic and hexachloroendomethylene tetrahydrophthalic; aromatic monocarboxylic, dicarboxylic and tricarboxylic acids such as benzoic, toluic, salicylic, phthalic, isophthalic, terephthalic, trimellitic, hemimellitic and trimesic; ethylenically unsaturated monocarboxylic and dicarboxylic acids such as acrylic, pentynoic, hexenoic, crotonic, pelargonic, maleic, fumaric, chloromaleic, itaconic, citraconic and mesaconic.

The amounts of carboxylic acid and aluminum isopropoxide which may be utilized in the preparation of the catalyst system of this invention may vary over a considerable range. Generally, however, an excess of carboxylic acid for each equivalent of aluminum compound will be utilized.

The catalyst system of this invention may be prepared by the reaction of aluminum isopropoxide with a carboxylic acid, preferably in anhydrous isopropanol, benzene, or other solvent. It may also be prepared in situ by adding aluminum isopropoxide to a reaction mixture which contains a free carboxylic acid. Although both methods of preparing the catalyst and, consequently, of carrying out the process of this invention offer distinct advantages over the prior art processes, each may be beneficially employed in certain instances. For example, if a 100 percent maleate polyester is desired, it is preferred to preform the catalyst and then add it to the reaction mixture. The reason for this preference is that it has been found that the presence of a free acid such as phthalic acid along with maleic anhydride will result in the formation of a maleate polyester containing traces of, for example, phthalate units. If, however, maleic acid were employed as free acid, there would be no foreign polyester formation and in situ catalysis would be acceptable. It has also been found that superior reaction control can be obtained by preparing the catalyst system in situ. This procedure allows for the majority of the reaction to occur at easily controllable temperatures substantially below 140° C. In any event, each factual situation must be analyzed separately before the catalyst system and the method of preparing it are selected. Variables such as the polyester desired and the starting material available play an important part in the selection of the catalyst system and its mode of preparation.

Only small amounts of the catalyst system are needed to effect a substantially complete reaction in a short time. For example, the reaction product of 0.2 mol of maleic acid and 0.015 mol of aluminum isopropoxide is sufficient to catalyze the reaction between maleic anhydride and 3,3,3-trichloropropylene oxide. Satisfactory results are ordinarily obtained with catalyst concentrations of from a few tenths of one percent to one percent or more, based on the total weight of the reactants. If desired, more or less than this amount may be used, even up to a relatively uneconomic ten percent by weight of reactants.

If the catalyst system is preformed, it may be used in its isolated form, or it may be suspended in a diluent or dissolved in a solvent. It is generally preferred to use a solventless system whenever possible since solvents are frequently difficult to remove from the product, making them economically undesirable, and they may also adversely influence the reaction and tend to discolor the product. If the catalyst system is formed in situ, it will generally be soluble in the reaction mixture at the reaction temperature.

The following examples are illustrative of the process of this invention.

EXAMPLES I–V

A series of five polyesters was prepared by charging, at room temperature, to a reaction vessel equipped with a thermometer, a mechanical stirrer and water-cooled condenser, maleic anhydride, phthalic anhydride, phthalic acid, 3,3,3-trichloropropylene oxide and aluminum isopropoxide in the mol ratios indicated in Table 1 below. The mixtures were stirred and heated to about 80° C., at which temperature the reactions exothermed. With the aid of external cooling, the reactions were easily maintained at about 100° C. After one hour, the reactions had subsided and the reaction mixtures were heated to about 120° C.–140° C. and maintained there for about one hour. The reaction mixtures were vacuum stripped at three millimeters of mercury and at a temperature of 125° C. The properties of the five polyesters are indicated in Table 1 below.

The polyesters were then dissolved in styrene and cured to a hard cross-linked plastic with one percent dimethylphosphite and 0.5% benzoyl peroxide for fifteen hours at 60° C., and for six hours at 100° C.

TABLE 1

| | Maleic Anhydride | | Phthalic Anhydride | | 3,3,3-Trichloropropylene Oxide (TCPO) | | Phthalic Acid | | Aluminum Isopropoxide, grams | Molecular Weight | Hydroxyl Number | Acid Number |
|---|---|---|---|---|---|---|---|---|---|---|---|---|
| | Grams | Mols | Grams | Mols | Grams | Mols | Grams | Mols | | | | |
| I | 196.0 | 2.0 | 37.0 | 0.25 | 607 | 3.75 | 41.5 | 0.25 | 7.5 | 2,230 | 38.6 | 8.9 |
| II | 196.0 | 2.0 | 37.0 | 0.25 | 607 | 3.75 | 41.5 | 0.25 | 6.25 | 1,878 | 32.3 | 8.3 |
| III | 196.0 | 2.0 | 37.0 | 0.25 | 607 | 3.75 | 41.5 | 0.25 | 5.0 | 2,694 | 36.3 | 6.2 |
| IV | 196.0 | 2.0 | 55.4 | 0.375 | 607 | 3.75 | 20.8 | 0.125 | 10.0 | 2,060 | 39.6 | 7.1 |
| V | 147.0 | 1.5 | 133.2 | 0.90 | 607 | 3.75 | 16.6 | 0.1 | 5.0 | 2,642 | 36.0 | 7.7 |

EXAMPLES VI–XII

Following the general procedure of the previous examples, several polyesters were prepared using as catalyst system the in situ reaction products of aluminum isopropoxide and a carboxylic acid. The various reactants, catalyst systems, reaction conditions and polymers prepared are described in Table 2.

TABLE 2

| Reactant | | | | Catalyst System | | | Reaction Conditions | | Polyester | | |
|---|---|---|---|---|---|---|---|---|---|---|---|
| Anhydride | | Alkylene Oxide | | Aluminum Isopropoxide Amt., Grams | Acid | | Temp.,[1] °C. | Time, Hrs. | Obtained (Grams) | M.W. | Acid No. |
| Name | Amt., Mols | Name | Amt., Mols | | Name | Amt., Mols | | | | | |
| VI | Maleic | 1.8 | TCPO [2] | 3.5 | 3 | Maleic | 0.2 | 85-100 / 125 | 1.0 / 1.0 | 578 | 2,150 | 8.2 |
| VII | Tetrachlorophthalic / Maleic | 0.375 / 1.87 | TCPO [2] | 3.75 | 5 | Phthalic | 0.25 | 105 / 140 | 0.5 / 2.0 | 843 | 2,500 | 5.5 |
| VIII | Maleic | 2.0 | TCPO [2] | 3.75 | 7.5 | Sebacic | 0.5 | 100-120 / 127-140 | 0.5 / 1.0 | 824 | 1,160 | 6.0 |
| IX | do | 2.25 | TCPO [2] | 3.75 | 7.5 | Benzoic | 0.25 | 90-100 / 120-140 | 0.33 / 2.0 | 731 | 1,888 | 18.8 |
| X | Phthalic | 2.0 | TCPO [2] | 2.75 | 7.5 | Adipic | 0.5 | 103-138 | 2.0 | 796 | 3,700 | 11.2 |
| XI | Maleic | 1.0 | TCPO [2] / Propylene oxide | 2.3 / 1.2 | 10.0 | Maleic | 1.00 | 96-109 / To 140 | 1.25 / 1.0 | 635 | 450 | 21.2 |
| XII | do | 1.67 | Propylene oxide / 3,3-dichloropropylene oxide | 1.2 / 3.06 | 6.0 | do | 0.34 | 87-109 / 125 | .5 / 1.0 | 523 | 524 | 23.1 |

[1] The first temperature given is the temperature at which the polymerization occurred. After the polymerization was completed, the reactions were driven to completion by heating to the second temperatures.
[2] 3,3,3-trichloropropylene oxide.

EXAMPLE XIII

(A) *Preparation of catalyst system*

In a reaction vessel, 0.2 mol of phthalic acid and 0.134 mol of aluminum isopropoxide were dissolved in 500 ml. of anhydrous isopropanol. The solvent was stripped at fifteen millimeters of mercury at a temperature of about 100° C. After all the solvent had been removed, the residual low boiling compounds were stripped at one millimeter of mercury at the same temperature for 72 hours. The sample contained 18.1% aluminum oxide (18.6% theoretical) as determined by ashing.

(B) *Polyester preparation*

A polyester was prepared by charging at room temperature to a reaction vessel equipped with a mechanical stirrer, thermometer and water-cooled condenser, one mol maleic anhydride, two mols of 3,3,3-trichloropropylene oxide and four grams of the catalyst system prepared as set forth in (A) above. The mixture was stirred and heated to about 140° C., at which temperature vigorous polymerization was observed. External cooling was required to maintain the temperature around 140° C. Upon completion of the reaction, the reaction mixture was heated at 140° C. for fifteen minutes. The reaction mixture was vacuum stripped at one millimeter of mercury and at a temperature of 140° C. The polyester had a molecular weight of 4573 and an acid number of 5.33.

Three hundred grams of this polyester was dissolved in 200 grams of styrene. The solution was then cured to a hard, cross-linked plastic with 1% dimethylphosphite and 0.5% benzoyl peroxide for sixteen hours at 60° C., and for six hours at 100° C.

EXAMPLE XIV

In a dry, nitrogen-flushed Carius tube (19 x 615 millimeter), 0.1 mol maleic anhydride, 0.2 mol 3,3,3-trifluoropropylene oxide and 0.75 gram of the catalyst system prepared as described in Example XIII, were charged at −60° C. with 35 grams orthodichlorobenzene as diluent. The sealed tube was heated in a steam bath for sixteen hours. The tube was cooled and the resinous, viscous solution washed out with some benzene. The solvents were vacuum stripped at 0.5 millimeter mercury and 100° C. to yield a polymer with an acid number of 2.8, and molecular weight of 1872.

Twenty-five grams of this product was dissolved in 25 grams of diallyl phthalate and 0.25 gram benzoyl peroxide was added. The mixture was cured overnight at 60° C., followed by a six-hour post-cure at 100° C. to a hard, cross-linked plastic.

EXAMPLE XV

In a reaction vessel equipped with a mechanical stirrer, thermometer, and water-cooled condenser, 2.0 mols 3,3-dichloropropylene oxide, 1.0 mol maleic anhydride and 7.5 grams of the catalyst system prepared as described in Example XIII were added and the mixture heated on a hot plate with occasional agitation. At about 150° C., polymerization started and the mixture exothermed to 170° C. The material was refluxed until all of the dichloropropylene oxide was consumed. The mixture was cooled back to 150° C. and vacuum stripped at one millimeter of mercury to remove any unreacted monomers. The polyester had a Gardner color of nine, a hydroxyl number of 2.18, and a molecular weight of 1051.

Two hundred grams of this polyester was dissolved in 300 grams of diallyl phthalate and cured with 2.5 grams benzoyl peroxide at 60° C. for sixteen hours, and 100° C. for six hours. The resulting plastic was a hard, cross-linked material.

The polyhalogenous alkylene oxides used to prepare the polyesters of the present invention are vicinal alkylene oxides, containing up to four carbon atoms, having an alkyl group attached to a carbon atom of the oxirane ring, said alkyl group having up to two carbon atoms and containing at least two halogen atoms. Representative of this class of alkylene oxides are 1,1-dichloro-2,3-epoxypropane,
1,1,1-trichloro-2,3-epoxypropane,
1,1,1-trifluoro-2,3-epoxypropane,
1-bromo-1,1-dichloro-2,3-epoxypropane, other mixed 1,1,1-trihalo-2,3-epoxypropanes,
1,1,1-trichloro-3,4-epoxybutane,
1,1-difluoro-1-chloro-2,3-epoxypropane,
1,1-dichloro-1-fluoro-2,3-epoxypropane,
1,1,1-tribromo-3,4-epoxybutane,
1,2-dibromo-3,4-epoxybutane,
1,1,1,2,2-pentachloro-3,4-epoxybutane,
1,1,1,2,2-pentafluoro-3,4-epoxybutane, and
1,1,1,2,2-mixed pentahalo-3,4-epoxybutanes.

Preferably all of the valences of the terminal carbon atom of the alkyl group are satisfied by halogen atoms, or, alternatively, the halogen atoms present are preferably present on the terminal carbon atom of the alkyl group.

When these polyhalogenous alkylene oxides react, the oxirane ring is opened with the breaking of an oxygen-carbon bond to give a bivalent unit wherein the members of the oxirane ring form a bivalent linear chain having the polyhalogenous lower-alkyl group, originally attached to a carbon atom of the oxirane ring, as an exo-substituent.

By its reaction with the acid or anhydride, this bivalent unit is bonded through the two free valences to other components of the polyester, thereby locating it in and along the polyester chain as a polyhaloalkyloxyalkylene group or radical and building the polyhalogenous lower-alkyl group into the polyester as an exo-substituent. The bivalent oxyalkylene radical may be bonded through both valences by way of ester linkages to acid radicals, or it may be bonded through one or both valences to additional oxyalkylene radicals to form a polyoxyalkylene chain. The average length of the oxyalkylene chains forming a polyether moiety in the polyester chain is determined by the precise reactant ratios, the reaction time, and temperature, as more fully explained hereinafter and as will be apparent to one skilled in the art.

In the formation of the polyesters in accordance with the present invention, it is possible to vary the proportion of alkylene oxide to dicarboxy compound over a considerable range. The polyesters so formed are of somewhat varied character, depending on the proportions of polyhalogeneous alkylene oxide and dicarboxy compound used. The preferred range in an individual case depends on a number of factors including intended use of the polyester, properties desired in both the polyester itself and in compositions based on the polyester, and the reactants employed. For example, ethylenically unsaturated polyesters having good color and workable viscosities are prepared by the reaction of 3,3,3-trichloropropylene oxide with maleic anhydride in a mol ratio of two of the former to one of the latter in the presence of a catalyst system of this invention. When cross-linked with a suitable amount of an unsaturated monomer such as styrene, a hard, durable, non-burning plastic having a high degree of chemical resistance is obtained. A polyester having a higher cross-link density, that is, a higher concentration of sites of unsaturation, may be obtained by decreasing the ratio of trichloropropylene oxide to maleic anhydride to 1:1. By increasing the ratio of 3:1 or higher, polyesters having decreased cross-link densities are obtained, which upon modification result in cross-linked products which are generally more flexible and less hard. In most instances, if it is desired to prepare ethylenically unsaturated polyesters which are to be cross-linked with ethylenically unsaturated cross-linking agents, it is preferred to use no more than three mols of poly-haloalkylene oxide for every mol of dicarboxy compound in order to obtain polyesters having the preferred cross-link densities. At molar ratios of alkylene oxide to ethylenically unsaturated dicarboxy compound above 3:1, the decreased cross-link density resulting from the increased length of the polyether units in the polyester chain, and consequently the increased spacing between the unsaturated sites of the polyester, is manifested by a decline in some of the advantageous physical properties of the cross-linked plastic, including hardness and strength, as well as in some of the advantageous chemical properties. For some applications, however, the higher ratios are quite suitable. In general, the higher the ratio of polyhalogenous alkylene oxide to dicarboxy compound, other factors being constant, the softer and more elastic the polyester composition. Ordinarily, ratios of alkylene oxide to dicarboxy compound of about 1:1 to about 3:1 are preferred although, if desired, ratios as high as 6:1 or even higher may be successfully employed. When mixtures of carboxy compounds or mixtures of alkylene oxides are employed, the ratios will remain approximately the same.

When mixtures of ethylenically unsaturated dicarboxy compounds with non-ethylenically unsaturated dicarboxy compounds are used, the resulting increased spacing between unsaturated sites of the polyester due to the inclusion in the polyester chain of dicarboxy units containing no ethylenic unsaturation is responsible for a decreased cross-link density, and frequently also a decrease in the desirable physical properties of cross-linked compositions formed therefrom. For this reason, to obtain polyesters having optimum cross-link densities, it is sometimes desirable to alter the ranges of proportions of the carboxylic acid or anhydride to alklene oxide to take into consideration the degree of unsaturation of the mixture of dicarboxy compounds being employed, as will be apparent to one skilled in the art.

When polyesters are being prepared for other purposes, such as incorporation into drying oils or unsaturated rubber, natural or synthetic, the proportions of alkylene oxide to dicarboxy compound may be advantageously varied over wide ranges and, as previously stated, polyesters having good workable viscosities and satisfactory molecular weights may be prepared by using ratios of alkylene oxide to dicarboxy compound as high as six or more to one.

The properties and structure of the polyesters may also be varied by using mixtures of alklene oxides, such as two or more polyhalogenous alkylene oxides together or a polyhalogenous alkylene oxide with a mono- or non-halogenous alkylene oxide. The use of such mixed oxides has the effect of minimizing the crystallinity of the polymer, and generally results in more flexible products when the polyester is further reacted. By controlling the order of addition of these combinations of alkylene oxides, it is moreover possible to tailor the polymer. In this way, for example, it is possible to space the pendant polyhalogeneous alkyl groups evenly along the polymer chain.

Alkylene oxides which may be used as co-reactants with the polyhalogenous alkylene oxides are vicinal alkylene oxides which are saturated or free of other than aromatic unsaturation. Any halogen present may be of the type indicated for the starting polyhalogenous alkylene oxide. Example of such alkylene oxides are ethylene, propylene, 1,2-butylene, 2,3-butylene, isobutylene and dodecene oxides, epichlorohydrin, epibromohydrin, styrene oxide, chlorostyrene oxide, methylstyrene oxide, methyl glycidyl ether, phenyl glycidyl ether, and oleic acid epoxide. The preferred maximum number of carbon atoms in any non-polyhalogenous alkylene oxide is eighteen.

The amount of such non-polyhalogenous alkylene oxide which can be employed is limited, and when a non-polyhalogenous alkylene oxide is employed as part of the starting alkylene oxide reactant, the percentage of polyhalogenous alkylene oxide in the total starting alkylene oxide reactant should not be less than about 50 percent and is preferably at least about 75 to 90 percent by weight. The non-polyhalogenous alkylene oxide starting material, when used, is saturated or devoid of other than aromatic unsaturation and has a hydrogen atom or an alkyl group attached to a carbon of its oxirane ring, said alkyl group having up to two carbon atoms and containing from zero to one halogen atom, inclusive.

Any halogen or combination of halogens may be present in the starting polyhalogenous alkylene oxide, and consequently also in the pendant polyhalogenous lower-alkyl groups built into the polyester. Of the halogens, chlorine, fluorine, and bromine are preferred, and the halogen, therefore, has an atomic weight of nineteen to eighty, inclusive.

In general, the higher the halogen content incorporated by the pendant polyhalogenoalkyl groups into the polymer, the better the over-all fire resistance and chemical resistance of the polyester products. For this reason, starting alkylene oxides containing more than two halogen atoms on the alkyl substituent of the oxirane ring are preferred over the corresponding alkylene oxides containing only two halogen atoms. By way of example, 3,3,3-trichloropropylene oxide, which contains three halogen atoms on the polyhalogenoalkyl group, is preferred over the corresponding dihalogenoalkylene oxide, 3,3-dichloropropylene oxide. The preferred halogen content by weight in the polyesters of the invention is at least about 25%, and preferably 35%–55%.

The starting acid and anhydride compounds which are utilized to prepare the polymers of the present invention are dicarboxylic acids and dicarboxylic acid anhydrides, preferably containing up to and including twelve carbon atoms. Representative compounds include aliphatic dicarboxylic acids such as malonic, succinic, perfluorosuccinic, glutaric, perfluoroglutaric, adipic, perfluoroadipic, pimelic, suberic, azelaic and sebacic; cycloaliphatic dicarboxylic acids such as tetrahydrophthalic hexahydroterephthalic and hexachloroendomethylene tetrahydrophthalic; aromatic dicarboxylic acids such as phthalic, isophthalic and terephthalic; ethylenically unsaturated dicarboxylic acids such as maleic, fumaric, chloromaleic, itaconic, citraconic and mesaconic. It should be noted that monocarboxylic acids may be used along with dicarboxylic acids or anhydrides as starting material when it is desired to carry out the process of this invention employing an in situ catalyst system based on the reaction product of aluminum isopropoxide and a monocarboxylic acid. Any of the monocarboxylic acids discussed hereinbefore in connection with the catalyst preparation are applicable for this purpose. Accordingly, when reference is made to the starting material as a dicarboxy compound, this may include a minor amount of monocarboxy compound. The dicarboxylic acids and anhydrides may be used singly or in mixtures, including mixtures of acids with anhydrides, and mixtures of ethylenically unsaturated dicarboxy compounds with non-ethylenically unsaturated dicarboxy compounds. Mixtures of ethylenically unsaturated carboxy compounds with other carboxy compounds are useful as the preparation of cross-linkable unsaturated polyesters. However, when mixtures of ethylenically unsaturated and non-ethylenically unsaturated compounds are used, the ethylenically unsaturated component of the mixture should be present in amount of at least about 40 percent, and preferably at least about 60 percent, by weight of the total dicarboxy component if it is desired to provide sufficient unsaturated sites for cross-linking. When less than this preferred minimum is used, cross-linked plastics derived from the resulting polyester tend to be softer and more flexible, with a decline in some of the desirable properties of the plastic. Usually, for plastics having optimum physical and chemical properties, the amount of ethylenically unsaturated carboxy compound in the mixture considerably exceeds the stated minimum.

The polyesters are generally formed by heating the polyhalogenous alkylene oxide with the starting organic dicarboxy compound, as well as other reactants, if any, in the presence of the catalyst at an elevated temperature ranging from about 50° C. to the reflux temperature of the polyhalogenous alkylene oxide, or higher, with a temperature of at least 90° C. being preferred. Normally, the reflux temperature of the reaction mixture, generally from about 100° C. to about 170° C. when a solventless system is used, is recommended. When a solvent is employed, the reflux temperature of the mixture may be considerably lower, as for example when toluene is used. However, it is not normally preferred to use a solvent since one is generally not needed and removal of solvent from the product is often economically disadvantageous. When it is desired to use a solvent, nonaqueous or substantially non-aqueous organic solvents and solvents which are unreactive with the reactants and products of the reaction are preferred. These include hydrocarbons such as benzene, toluene and hexane; and halohydrocarbons such as halobenzenes, e.g., chlorobenzene, halotoluenes and aliphatic halohydrocarbons such as high-boiling polyhalomethanes. With low-boiling solvents it may be necessary to conduct the reaction under greater than atmospheric pressure, but normally atmospheric pressure is preferred since the use of increased pressure, although operative, sometimes makes control of the exothermic heat of reaction difficult. The reaction may be advantageously conducted under an inert atmosphere, as of nitrogen or carbon dioxide. The use of such an inert atmosphere usually improves the over-all color of the product.

There are several different procedures which may be followed in carrying out the reaction between the starting polyhalogenous alkylene oxide and dicarboxy compound. For example, if the catalyst has been preformed and then is to be added to the reaction mixture, it may be added first, simultaneously with the other components, subsequent to the addition of the other components, or subsequent to the addition of one component and prior to the addition of the other(s).

If the catalyst is formed in situ, aluminum isopropoxide may be added to the dicarboxy compound and, thereafter, the alkylene oxide may be added. Alternatively, aluminum isopropoxide may be added to a reaction mixture of dicarboxy compound and alkylene oxide.

The reaction between the dicarboxy compound and the alkylene oxide is exothermic at reaction temperatures; therefore, external heating is not necessary during most of the reaction. In carrying out the process of this invention using the novel catalyst system, no difficulty is experienced in temperature control, notwithstanding the exothermic nature of the reaction.

It is possible to take advantage of the exothermic heat of reaction by adding one or more of the reactants to the reaction mixture portionwise, preferably the alkylene oxide, at such a rate that the desired reaction temperature is maintained. Once the initial polymerization stage has been completed, as indicated by the cessation of refluxing when a solventless reaction is conducted at the reflux temperature of the reaction mixture, the reaction mixture is heated for an additional period to drive the reaction to completion and to effect the desired degree of polymerization. In one variation of this general procedure, the dicarboxy compound may be initially reacted with the catalyst to form a catalyst-monomer complex which is in turn reacted with the polyhalogenous alkylene oxide. Alternatively, the catalyst-monomer complex may be initially esterified with a portion of the polyhalogenous alkylene oxide, and then reacted with the remaining alkylene oxide which is added to the reaction mixture continuously, incrementally, or batchwise. In another variation, only a portion of the dicarboxy compound or mixture of dicarboxy compounds is initially reacted with the polyhalogenous alkylene oxide and then finally the remainder. In addition, combinations of two or more of these approaches and other variations readily apparent to one skilled in the art may be used to carry out the reaction. The procedure may be the same whether one or more polyhalogenous alkylene oxides or mixtures was a non-polyhalogenous alkylene oxide are employed as starting material, and whether one or more saturated or unsaturated dicarboxylic compounds or mixtures thereof are employed as starting materials.

Although other procedures may be used, the reaction is advantageously carried out in a polymerization or other type reaction container fitted with condensing and stirring apparatus, a temperature recording or reading device, and a heat exchange source.

The polyesters of the present invention are non-self-fusible, glassy, solid or semi-sticky materials. The color of the polyesters generally ranges from Gardner Color Scale (1953 series) of four to twelve, although the color may be further improved by using such modifications as an inert atmosphere, extremely high grades of reactants, variations in catalyst and catalyst concentration, and temperature. They are soluble in most organic polar and non-polar solvents, with the notable exception, in most cases, of diethylether and water, as well as in many monomers, including styrene, butyl methacrylate, triallylisocyanurate, and diallylphthalate. The polyesters have been found to be compatible in nearly any ratio with standard resins. Because of these solubilities, it is frequently convenient to mix the polyester with further reactants and/or standard resins with which they are to be reacted or co-reacted, as in the case of unsaturated polyesters which are to be cross-linked, and store the resulting mixtures until needed for use. The polyester itself, being non-self-fusible, may be stored in convenient granular, powdered, or viscous but non-self-fusible form.

The molecular weights of the polyesters produced according to the present invention range from that of the mono adduct of one dicarboxy compound molecule with one oxide molecule, generally around 275, but depending, of course, on the individual reactants, to more than 10,000.

As stated above, the products produced in accordance with the present invention may be beneficially used for a variety of purposes, including use in the preparation of alkyd-type resins and most applications where commercial polyesters are currently being used, but giving products with superior fire and chemical resistance. They range from liquids to rubbery elastomers to hard, strong plastics. These products can be used for a variety of purposes in such diversified fields as adhesives and coatings. Otherwise, the products may be used to impart beneficial characteristics to alkyd resins, and in coating compositions and laminates of various types. Ethylenically unsaturated polyesters can be cross-linked with various ethylenically unsaturated cross-linking agents to yield materials useful in a wide variety of applications, including flexible and rigid coatings, elastomers, rubbers, and soft to hard plastics, all having a high degree of non-flammability and chemical resistance and, in many cases, even being non-burning. The physical properties of these polyester materials may be up-graded by the addition, according to well-known procedures, of some auxiliary natural or synthetic material such as glass fibers, asbestos, sisal, cotton, nylon (polyamide and polyester), and wood and pigment fillers, to give reinforced plastics and laminates of superior strength and a high degree of non-flammability.

In addition, especially if ethylenically unsaturated, the polyesters may be mixed with certain drying oils such as linseed oil and perilla oil and coated on a surface to undergo oxidative non-linking or polymerization and give tough, elastic, weather and chemical resistant air-drying films which have improved fire resistance. Additional uses and modifications of the stated uses will be readily apparent to one skilled in the art.

We claim:
1. A process for preparing a polyester characterized by the presence of pendant haloalkyl groups which have up to two carbon atoms and which contain at least two halogen atoms, comprising heating and contacting in the presence of a catalyst system comprising the reaction product obtained by heating and contacting aluminum isopropoxide with a carboxylic acid
   (1) a member selected from the group consisting of
       (a) dicarboxylic acid anhydrides,
       (b) dicarboxylic acids, and
       (c) mixtures of (a) with (b), and
   (2) a vicinal alkylene oxide, selected from the group consisting of
       (a) a vicinal alkylene oxide containing from three to four carbon atoms, inclusive, and having an alkyl group attached to a carbon atom of the oxirane ring, said alkyl group having up to two carbon atoms and containing at least two halogen atoms, each halogen having an atomic weight of nineteen to eighty, inclusive, and
       (b) an alkylene oxide as defined in (a) together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and an alkyl group, said alkyl group having up to two carbon atoms and containing from zero to one halogen atom, inclusive, any halogen having an atomic weight of nineteen to eighty, inclusive, said alkylene oxide as defined in (a) being present in amount of at least about fifty percent by weight of the total amount of alkylene oxide as defined in (b).

2. The process of claim 1 wherein the catalyst system is prepared in situ.

3. The process of claim 1 wherein the catalyst system is preformed.

4. The process of claim 1 wherein the catalyst system comprises the reaction product obtained by heating and contacting aluminum isopropoxide and maleic acid.

5. The process of claim 1 wherein the catalyst system comprises the reaction product obtained by heating and contacting aluminum isopropoxide and phthalic acid.

6. The process of claim 1 wherein the catalyst system comprises the reaction product obtained by heating and contacting aluminum isopropoxide and benzoic acid.

7. The process of claim 1 wherein the carboxylic acid is phthalic acid, (1) is maleic anhydride and (2) is 3,3,3-trichloropropylene oxide.

8. The process of claim 1 wherein the carboxylic acid is maleic acid, (1) is maleic anhydride and (2) is 3,3,3-trichloropropylene oxide.

9. The process of claim 1 wherein the carboxylic acid is maleic acid, (1) is maleic anhydride and phthalic anhydride and (2) is 3,3,3-trichloropropylene oxide.

10. The process of claim 1 wherein the carboxylic acid is phthalic acid, (1) is maleic anhydride and phthalic anhydride and (2) is 3,3,3-trichloropropylene oxide.

11. The process of claim 1 wherein the carboxylic acid is benzoic acid, (1) is maleic anhydride and (2) is 3,3,3-trichloropropylene oxide.

12. The process of claim 1 wherein the carboxylic acid is maleic acid, (1) is maleic anhydride and (2) is epichlorohydrin and 3,3,3-trichloropropylene oxide.

13. The process of claim 1 wherein the carboxylic acid is maleic acid, (1) is maleic anhydride and (2) is propylene oxide and 3,3-dichloropropylene oxide.

References Cited

UNITED STATES PATENTS 3,254,057   5/1966   Davis _____ 260—78.4

FOREIGN PATENTS 639,670   5/1964   Belgium.

JOSEPH L. SCHOFER, *Primary Examiner.*

L. WOLF, J. A. SEIDLECK, *Assistant Examiners.*